United States Patent
Graunke et al.

[11] Patent Number: 6,105,137
[45] Date of Patent: Aug. 15, 2000

[54] METHOD AND APPARATUS FOR INTEGRITY VERIFICATION, AUTHENTICATION, AND SECURE LINKAGE OF SOFTWARE MODULES

[75] Inventors: Gary L. Graunke, Beaverton; Carlos V. Rozas, Portland, both of Oreg.

[73] Assignee: Intel Corporation, Santa Clara, Calif.

[21] Appl. No.: 09/109,472

[22] Filed: Jul. 2, 1998

[51] Int. Cl.[7] .............. G06F 11/30; H02H 3/05; H04L 9/00; H04K 1/00
[52] U.S. Cl. .............. 713/201; 713/202; 714/38; 380/4; 380/25
[58] Field of Search ............... 380/3, 4, 21, 25, 380/30; 714/38; 713/200, 201, 202

[56] References Cited

U.S. PATENT DOCUMENTS

| | | | |
|---|---|---|---|
| 5,442,706 | 8/1995 | Kung | 380/30 |
| 5,473,692 | 12/1995 | Davis | 380/25 |
| 5,475,753 | 12/1995 | Barbará et al. | 380/4 |
| 5,559,814 | 9/1996 | Rolin et al. | 371/67.1 |
| 5,612,682 | 3/1997 | DeLuca et al. | 380/825.34 |
| 5,625,693 | 4/1997 | Rohatgi et al. | 380/23 |
| 5,757,914 | 5/1998 | McManis | 380/23 |
| 5,796,941 | 8/1998 | Lita | 395/187.01 |
| 5,850,559 | 12/1998 | Angelo et al. | 395/7 |
| 5,872,848 | 2/1999 | Romney et al. | 380/25 |
| 5,887,131 | 3/1999 | Angelo | 395/188.01 |
| 5,901,227 | 5/1999 | Perlman | 380/21 |
| 5,903,721 | 5/1999 | Sixtus | 395/187.01 |
| 5,903,882 | 5/1999 | Asay et al. | 705/44 |
| 5,915,021 | 6/1999 | Herlin et al. | 380/21 |
| 5,926,548 | 7/1999 | Okamoto | 380/24 |
| 5,933,503 | 8/1999 | Schell et al. | 380/25 |
| 5,953,420 | 9/1999 | Matyas, Jr. et al. | 380/21 |
| 5,953,424 | 9/1999 | Vogelesanag et al. | 380/25 |

*Primary Examiner*—Norman M. Wright
*Attorney, Agent, or Firm*—Mark Seeley

[57] ABSTRACT

A method and apparatus of authenticating and verifying the integrity of software modules is disclosed. In one embodiment, said software modules initially establish their corresponding credentials. Then said local software module ensures its integrity by validating its own digital signature. Said local software module authenticates the integrity of said partner software module after having derived and validated certain information from said partner module's credential. In addition, secure linkage between said local software module and said partner software module is maintained.

19 Claims, 6 Drawing Sheets

METHOD AND APPARATUS FOR INTEGRITY VERIFICATION, AUTHENTICATION, AND SECURE LINKAGE OF SOFTWARE MODULES

FIELD OF THE INVENTION

This invention relates to data security generally and particularly to systems for providing data integrity verification and authentication functionality.

BACKGROUND OF THE INVENTION

As networked computer systems proliferate, individuals or corporations are subject to more and more unwanted attacks on their systems. For example, hackers have been reportedly successful in infiltrated into user's financial accounts and perform unauthorized transactions from the accounts. Further, even certain cryptographic applications have been proven vulnerable, because the trusted software is replaced with infected code without being detected. As a result, confidential information embedded in the application, such as the user's private key, is leaked out in the normal output of the application. Yet another type of attack is software viruses. These viruses infect their targets by masquerading as popular software or by attaching themselves to programs. When the target is infected, its confidential information may be compromised, or worse yet, its content may be destroyed.

In order to combat these attacks, users need methods of authenticating the origin of software and validating the integrity of the software. Many existing methods today address one aspect of the problem, but not the other. For instance, the known public-key cryptography and digital signature techniques are often compromised, because the private keys are often embedded in the software modules. Further, the authentication process often cannot proceed while the modules are being executed. Consequently, when these modules are in memory, they are susceptible to stealth virus attacks. As has been shown, an improved method and apparatus is needed to ensure not only the integrity of the software modules, but also the secured execution of such modules.

SUMMARY OF THE INVENTION

A method and apparatus of authenticating and verifying the integrity of software modules is disclosed. In one embodiment, each software module initially establishes its own credentials. Then the local software module ensures its integrity by validating its own digital signature. The local software module proceeds to authenticate the integrity of the partner software module after having derived and validated certain information from the partner module's credential. In addition, secure linkage between the local software module and the partner software module is maintained.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for authenticating and verifying the integrity of software modules is described. In the following description, numerous specific details are set forth such as registry, etc. in order to provide a thorough understanding of the present invention. However, it will be apparent to one of ordinary skill in the art that the invention may be practiced without these particular details. In other instances, well known elements and theories such as public-key cryptography, encryption, digital signatures, cryptographic hash functions, etc. have not been discussed in special details in order to avoid unnecessarily obscuring the present invention. Also, unless having been indicated otherwise, words such as digital signature, digital certificate and software module are used interchangeably throughout the description with signature, certificate and module, respectively.

Figure 1:
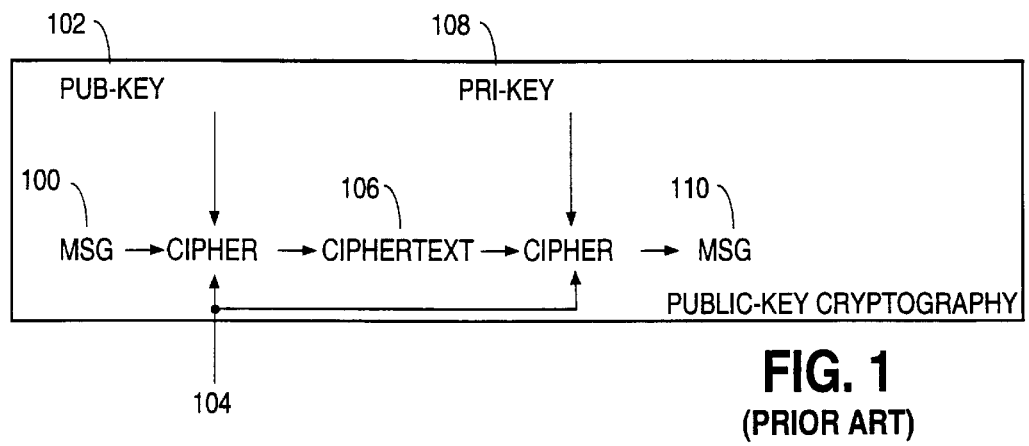
FIG. 1 illustrates a public-key cryptographic system.

FIG. 1 illustrates a known public-key cryptographic system. Msg 100 is unencrypted binary data. It can be a stream of bits, a text file, a stream of digitized voice, or a digital video image, to present just a few of the many possibilities. Ciphertext 106 is the result of applying the encryption/decryption function, cipher 104, and the public key 102, to msg 100. In mathematical notation:

$$\text{Cipher}_{104}(\text{Msg}_{100}, \text{Public Key}_{102}) = \text{Ciphertext}_{106}$$

The receiver of ciphertext 106 can only recover msg 100 by applying cipher 104 and the proper private key 108 to ciphertext 106. In mathematical notation:

$$\text{Cipher}_{104}(\text{Ciphertext}_{106}, \text{Private Key}_{108}) = \text{Msg}_{110}$$

And the goal is to have:

$$\text{Msg}_{100} = \text{Msg}_{110}$$

A public-key cryptographic system is asymmetric. Specifically, the decryption key, or private key 108 is different than the encryption key, or public key 102. Although private key 108 cannot be readily derived from public key 102, they are related. Thus, without the proper public/private key pair, the receiver of ciphertext 106 will have a difficult time deciphering the encrypted msg 100. Additionally, the receiver is presumed to be the only person who knows his/her own private key 108, but public key 102 can be made public.

Figure 2:
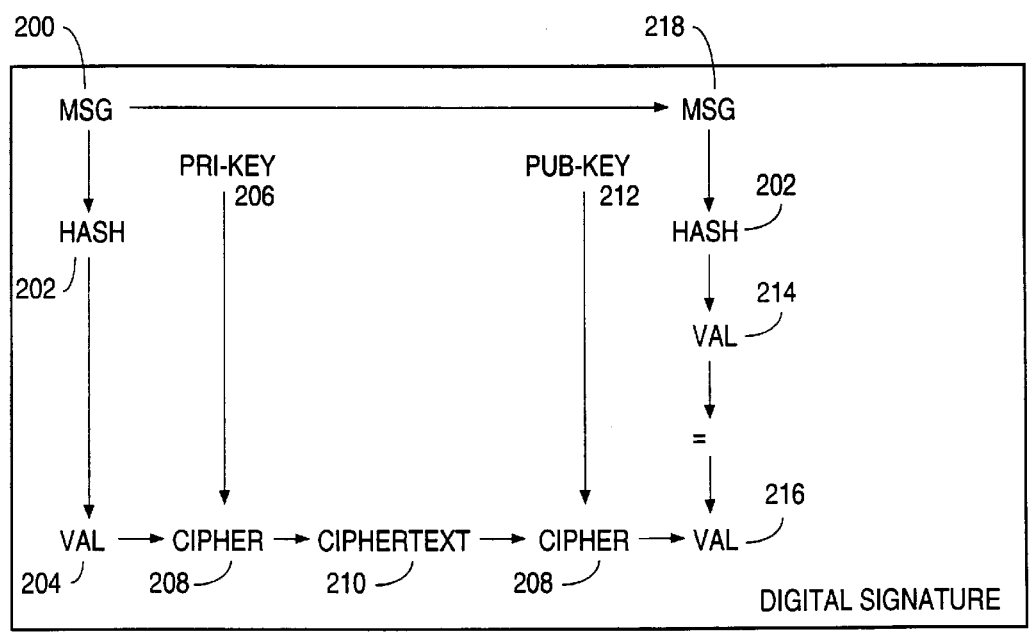
FIG. 2 illustrates a digital signature system.

By applying similar encryption and decryption principles, digital signatures are often used to certify digital messages. FIG. 2 illustrates such a known system. In particular, a unique value 204 for msg 200 is generated by means of one-way hash function 202. The resulting value 204 is considered a small finger print of msg 200. It also serves to deter malicious attackers from substituting false information for msg 200's original data. After val 204 is encrypted using private key 206 of the sender and signer of msg 200, the resulting ciphertext 210 is considered the digital signature of msg 200.

In order to verify that msg 200 has not been altered during transmission, the recipient first applies one-way hash function 202 to msg 218 and calculates val 214. Then the recipient compares val 214 with val 216. Val 216 is obtained by deciphering the signature, or ciphertext 210, using the signer's public key 212 with cipher 208.

Figure 3:
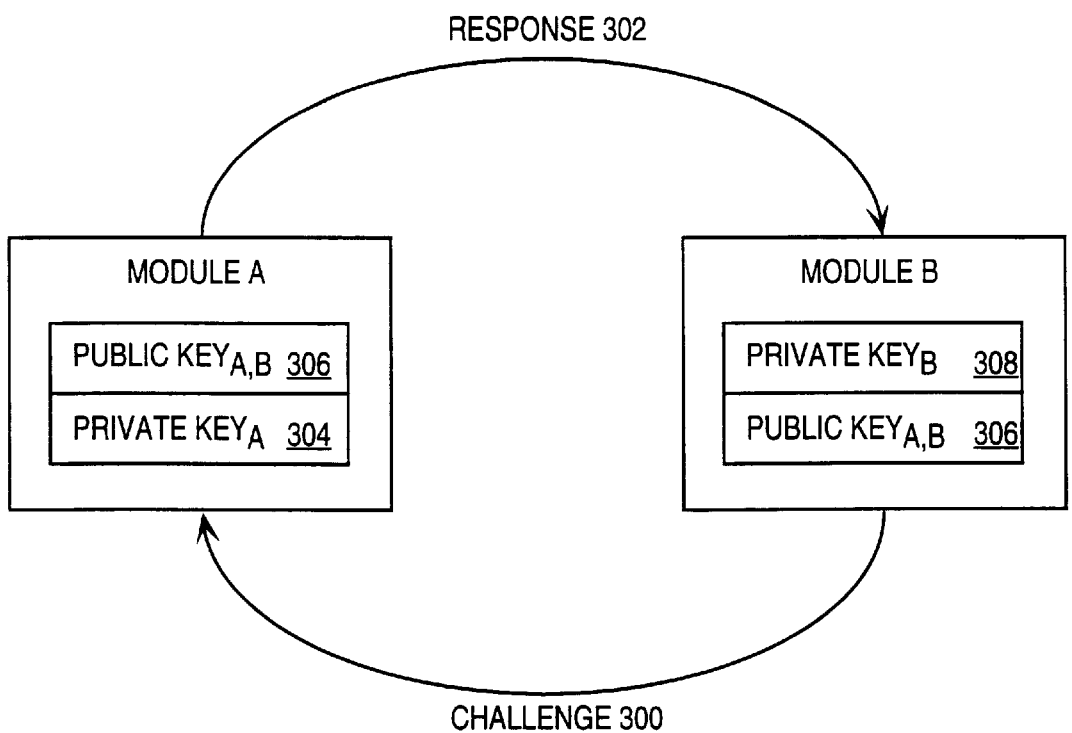
FIG. 3 illustrates an example of two software modules applying public-key cryptography and digital signatures.

Having discussed these fundamental encryption/decryption principles, FIG. 3 demonstrates a prior art system with two software modules applying these principles. For example, module B only wishes to work with properly licensed modules, such as module A. Both modules A and B are presumed to know each others' public keys 306 and have their private keys 304 and 308 embedded in their own software. To start, module B issues a challenge 300 with a random number. Module A responds by signing the random number in response 302, or in mathematical notations:

$R_1$=random number
$h_1$=Hash($R_1$), where Hash is the previously discussed one-way hash function or 202 in FIG. 2
E=encryption function or cipher 104 or 208 in FIGS. 1 and 2

Thus, response $302=E_{private\ key\ 304}(h_1)$, where private key 304 is used to encrypt $h_1$.
Since module B knows module A's public key, thus:
D=decryption function or cipher 104 or 208 in FIGS. 1 and 2
$h_2=D_{public\ key\ 306}(E_{private\ key\ 304}(h_1))$
Then B performs another one-way hash function on the received random number, $R_2$, in response 302:
$h_3$=Hash($R_2$)
If $h_2$ equals to $h_3$, the identity of module A has been authenticated. Module B can then be assured that module A has been properly licensed. It should be noted that the discussed authentication process may operate in a bilateral fashion. In other words, module A may initiate a challenge to authenticate module B.

However, this verification process for the software modules have several shortcomings. One, since each module's private key is embedded in the program, the key can be obtained by reverse engineering the module. Two, the integrity of the software modules is not verified in this process. Although known techniques can be used to verify module integrity when the module resides in secondary storage such as data storage device 510 in FIG. 5, such techniques are incapable of validating the modules after they are loaded into primary memory such as random access memory 504 in FIG. 5. In other words, when these modules reside in primary memory, they are susceptible to modifications. Three, although module B may believe that it has module A's public key and subsequently authenticates A's signature, module A may actually be module C and has defrauded module B into believing module C is module A.

Figure 4:
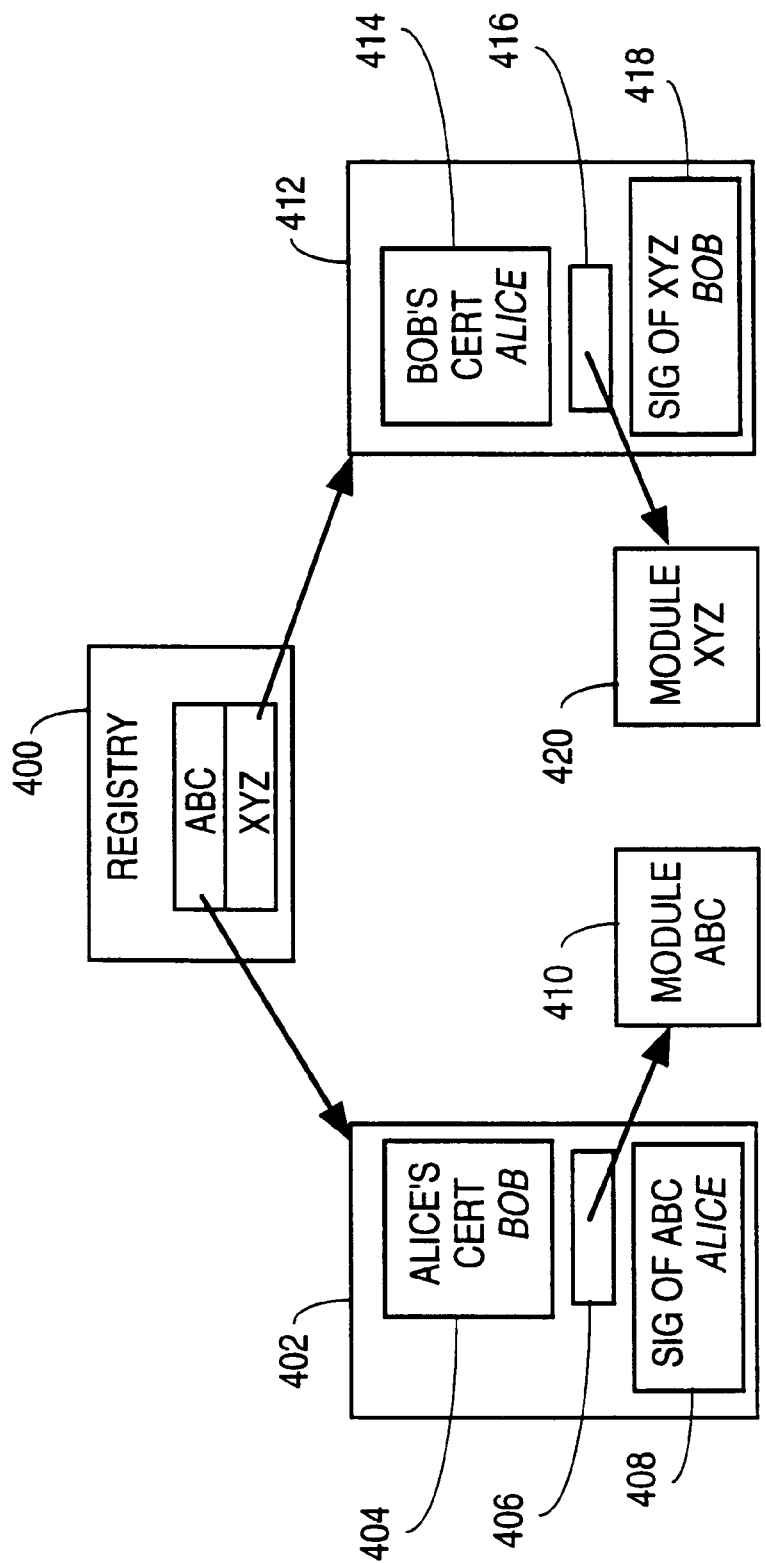
FIG. 4 illustrates the block diagram of one embodiment of the present invention.

FIG. 4 illustrates the block diagram of one embodiment of the present invention which addresses all the mentioned flaws. The block diagram can be programmed or implemented in various types of systems. One such system is illustrated on a general purpose computer system in FIG. 5. Such a computer system architecture comprises a bus element 500 for communicating information, a processor 502 coupled with said bus element 500 for processing audio, video and data information, a random access memory 504 coupled with said bus element 500 for storing static information and instructions for said processor 502, a data storage device 510 such as a magnetic disk and disk drive coupled with said bus element 500 for storing information and instructions, a readable medium 512 such as a floppy disk or a CD coupled with said bus element 500 for retrieving information and instructions for said processor 502, said bus element 500 coupled to network 514 for accessing resources on said network 514 such as server 518 and remote terminal 516, a display device 506 coupled to said bus element 500 for displaying information to the computer user and an alphanumeric or other type of input device 508 coupled to said bus element 500 for communicating information and command selections to said processor 502.

Operation of the Present Invention

The invention at hand is a method and apparatus for authenticating and verifying the integrity of software modules. Specifically, the present invention allows software modules to verify their data integrity even while the modules are being executed. Also, neither module contains the required secret information, such as private keys, for the authentication process. Lastly, since the present invention enables software modules to verify each other while they are being executed, the invention further ensures the modules' integrity by validating their expected memory locations and contents of the memory locations.

One embodiment of the invention is a general purpose computer system operating on various components as illustrated in FIG. 4. Registry 400 points to software modules' credentials 402 and 412. Alice is the owner of software module ABC 410, and Bob is the owner of software module XYZ 420. When Alice initiates the authentication process to verify Bob's XYZ 420, Alice's ABC 410 is considered a local software module and Bob's XYZ 420 a partner software module. It should be noted that a local software module is not necessarily a calling module. For example, Alice's ABC 410 may call Bob's XYZ 420, but Bob's XYZ 420 may initiate the authentication process on Alice's module. In that scenario, even though Bob's XYZ 420 is a callee, it is still considered a local module in the following discussion. Moreover, when Alice's ABC 410 calls Bob's XYZ 420 or vice versa, a linkage between the modules is established.

Alice's credential 402 consists of Alice's certificate 404, a reference 406 to Alice's module ABC 410 and Alice's own signature 408 of module 410. Additionally, Alice's certificate 404 is signed by Bob using known digital signature schemes. On the other hand, Bob's credential 412 contains the same components as Alice's credential, namely, Bob's certificate 414, Bob's reference 416 to module XYZ 420, and Bob's signature 418 of module XYZ 420. Similarly, Bob's certificate 414 is signed by Alice.

It should be noted that although specific components in one embodiment of the present invention are described, other components may be incorporated without exceeding the scope of the invention. For example, Alice's credential 402 may include certificates of partners or licensing authorities, such as another digital certificate for Bob. This added certificate may be issued by Bob's company in an attempt to attest to Bob's authority to sign Alice's certificate 404. Furthermore, Alice's module ABC 410 may want to cooperate with modules other than XYZ 420. Thus, registry 400 may include additional entries, and Alice's credential 402 may encompass additional certificates signed by Alice's desired partners.

The operations of the illustrative system in FIG. 4 can be characterized in four phases: credential building phase, credential registering phase, self checking phase and partner module checking phase. In one embodiment of the present invention, each owner of a software module has a credential builder. Using the example in FIG. 4, in phase 1 or the credential building phase, the credential builder takes various inputs such as Alice's certificate signed by Bob, a reference to module ABC and Alice's signature of module ABC and forms Alice's credential. An example of a resulting credential for Alice is a computer file with all the recited input information.

In phase 2 or the credential registering phase, one embodiment is to register Alice's credential in a predetermined location, such as registry 400, so that other software modules know where to look for Alice's module information. It should be noted that registry 400, Alice's and Bob's credentials and module information in FIG. 4 do not all have to reside on the same machine. For instance, Alice's credential 402 may reside on a network server. When Bob's module attempts to find Alice's module, registry 400 will direct Bob to the appropriate server on the network to identify Alice's credential 402. After having located Alice's credential 402, reference 406 within credential 402 then points Bob to Alice's module ABC 410.

Also, although the registry is used in describing one embodiment of the present invention, it will be apparent to one of ordinary skill in the art to use other methods for tracking and locating software modules' credentials. Finally, as the embodiment in FIG. 4 demonstrates, software modules and their credentials are separate entities. Therefore, software modules do not have any secret information embedded in them, such as their own private keys.

After credentials have been established and registered, software modules then enter phase 3 or the self checking phase. Again using FIG. 4 as an illustration, when Alice's module is initializing, Alice first searches through registry 400 for her own credential. After the registry points her to credential 402, Alice uses her digital signature verifier with her public key to verify her signature 408. Specifically, the digital signature verifier is described in detail above and in connection with FIG. 2. In mathematical notations:

$h_1$=Hash(Alice's module$_{t1}$), where Hash is the previously discussed one-way hash function or 202 in FIG. 2, and Alice's module$_{t1}$ stands for a snap shot of the module at time one.

E=encryption function or cipher 104 or 208 in FIGS. 1 and 2

Thus, Alice's signature 408=$E_{Alice's\ private\ key}(h_1)$, where Alice's private key is used to encrypt $h_1$.

Since Alice knows her own public key, thus:

D=digital signature verifier or cipher 104 or 208 in FIGS. 1 and 2

$h_2 = D_{Alice's\ public\ key}(E_{Alice's\ private\ key}(h_1))$

Then Alice may perform another one-way hash function on her current module:

$h_3$=Hash(Alice's module$_{t2}$) where t2 stands for time two and occurs later than time one.

If $h_2$ equals to $h_3$, then the integrity of Alice's module has been authenticated. Or in other instances, $h_3$ may not need to be computed. But rather, Alice simply needs to compare $h_1$ with $h_2$.

Although the illustrated digital signature verifier uses one type of message recovery signature scheme in phase 3, it should be apparent to one ordinarily skilled in the art to apply other digital signature schemes without exceeding the scope of the present invention. One such scheme directly uses signature 210, public key 212 and hash value 214 in one verification step. Furthermore, even though the above mathematical equations calculate Alice's signature 408 using Alice's entire module at time 1, or $E_{Alice's\ private\ key}(h_1)$, it should be apparent to one ordinarily skilled in the art to generate signature 408 with only portions of Alice's module. For instance, the signature generation process may omit the initialized data sections of Alice's module, since the data residing in these sections change during module's execution.

It should also be emphasized that Alice's module contains only her public key information and not her private key information. It should be further noted that this self checking phase can be performed on a memory image of Alice's module in addition to other machine readable mediums such as CDs or disks. With the capability of verifying memory images of software modules, when modules reside in primary memory such as random access memory 504 in FIG. 5, the present invention may continuously validate the modules even when the modules are being executed.

Figure 6:
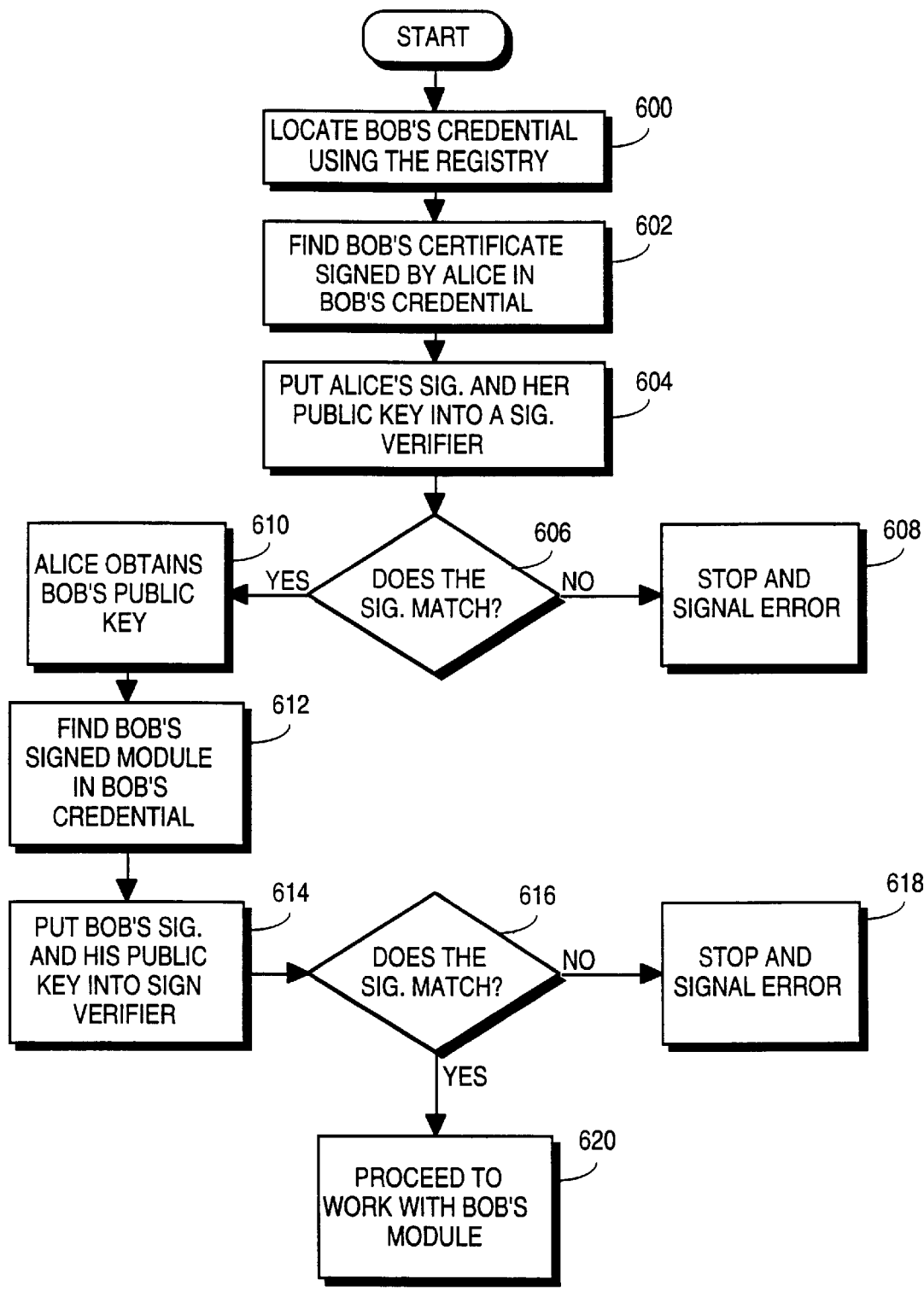
FIG. 6 illustrates a flow chart for a credential verifier used in partner module checking phase

After Alice's module has been verified, Alice's module calls Bob's module and initiates the authentication process. Therefore, Alice's module is both the caller module and the local module. Bob's module, on the other hand, is both the callee module and the partner module. FIG. 6 details a credential verifier's flow chart in phase 4 or the partner module checking phase in one embodiment of the present invention. It should be noted that some steps of the credential verifier can either be expanded, eliminated or combined with other steps without exceeding the scope of the invention.

Using FIG. 4 as an illustration, in step 600 shown in FIG. 6, Alice's module or the local module searches through registry 400 to search for the reference to Bob's credential. After finding Bob's credential 412, Alice proceeds in step 602 to identify Bob's certificate 414, signed by Alice, in Bob's credential 412. Since Alice knows her own public key, in step 604, Alice puts her public key along with her signature on Bob's certificate 414 into a digital signature verifier, which has been discussed extensively above and in connection with FIG. 2.

When the verification result from step 606 is invalid, step 608 signals an error to Alice and stops Alice from proceeding further. If however the result of the comparison in step 606 is valid, Alice can now trust Bob's certificate 414. Since Bob's certificate 414 contains Bob's public key information, Alice obtains Bob's public key in step 610. With Bob's public key, Alice proceeds to find Bob's signature 418 of Bob's software module 420 in step 612. In step 614, Alice enters her copy of Bob's public key and Bob's signature 418 into a digital signature verifier. If the result in step 616 is invalid, step 620 again signals an error to Alice and stops Alice from continuing on. On the other hand, a valid result indicates that Bob's module has been authenticated, and Alice may proceed to work with Bob's module. It should be emphasized that the present invention can operate in a bilateral fashion. Thus, Bob can similarly authenticate Alice's module utilizing all the described steps.

It should be further noted that the described credential verifier can continue operating in part or as a whole while Alice's and Bob's modules are being executed. This ensures the integrity of the modules during the modules' execution. In particular, depending on design parameters and goals, certain steps shown in FIG. 6 may not need to execute each time the credential verifier is invoked. Each software module may also determine its required frequency of invoking the credential verifier. These mentioned variations in implementing and invoking the credential verifier should be apparent to one of ordinary skill in the art without departing from the spirit and the scope of the present invention.

Figure 7:
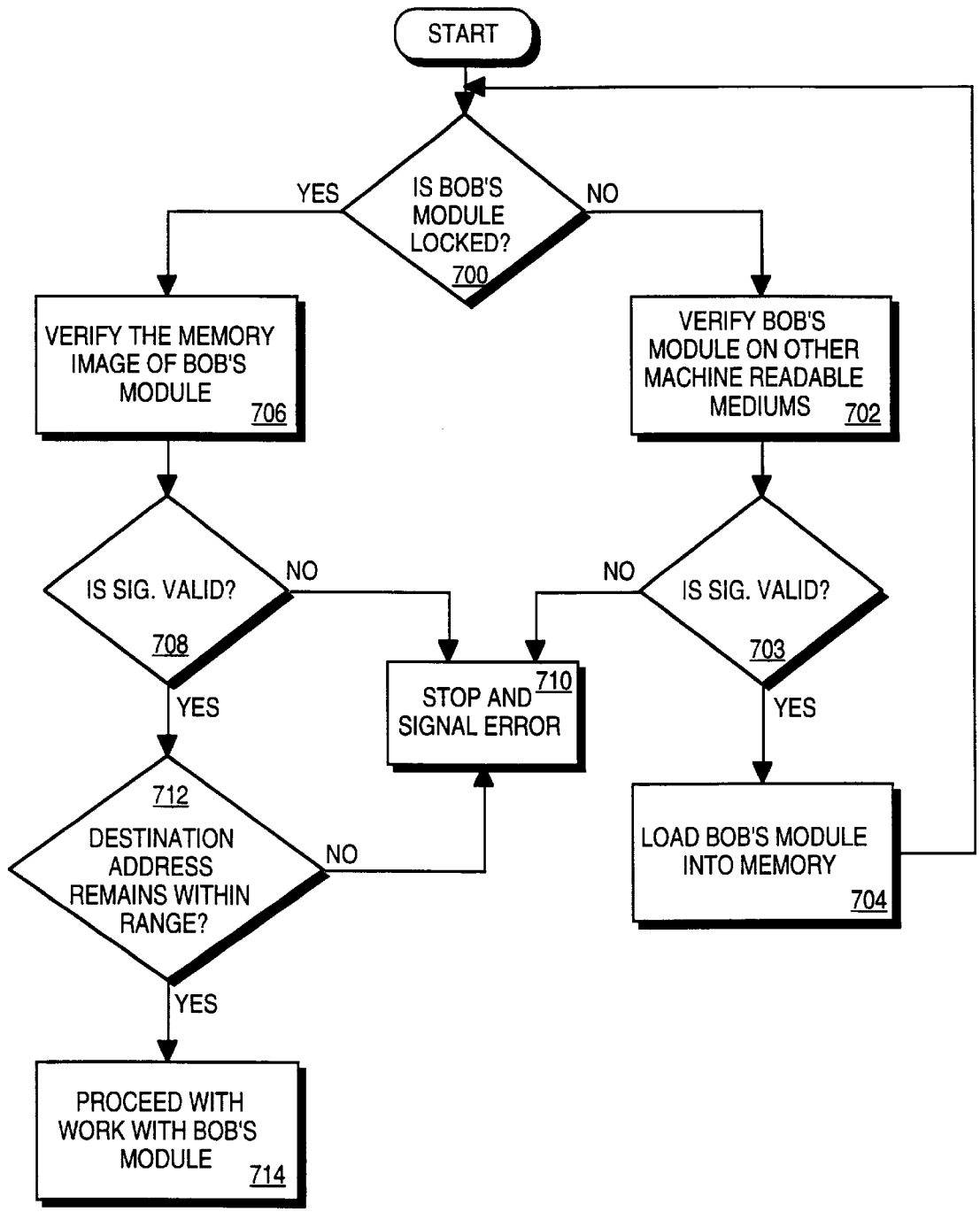
FIG. 7 illustrates a flow chart for additional functionality of the credential verifier

Moreover, other verification schemes can be included in the credential verifier without exceeding the scope of the present invention. For example, step 614 may incorporate additional checking policies to raise the level of authenticity for the modules. In particular, FIG. 7 illustrates one such policy. In step 700, Alice checks whether Bob's module has been loaded into memory. If not, in step 702 Alice verifies Bob's modules residing on other machine readable mediums such as disks, CDs, etc. using the previously described digital signature verifier. If the result from step 703 is valid, Alice proceeds to either wait for Bob to load his own module into memory or loads the module into memory for Bob in step 704. An invalid result from step 703 directs Alice to step 710 and stops her from continuing on.

However, when Bob's module has been loaded into memory, Bob's module is verified using the digital signature verifier in steps 706 and 708. After the validation of Bob's module, Alice performs another check in step 712 to ensure a secured linkage between Alice's module and Bob's module. In particular, a memory checker checks the addresses to be called, or the destination addresses in Bob's module, against the valid address ranges of Bob's module. If the destination addresses remain within the valid ranges in step 712, Alice can proceed to work with Bob's module. Additionally, the memory checker checks a caller's addresses against the calling module's, or Alice's module, valid address ranges. As has been mentioned previously, such verification steps can continue while the modules are being executed.

Figure 5:
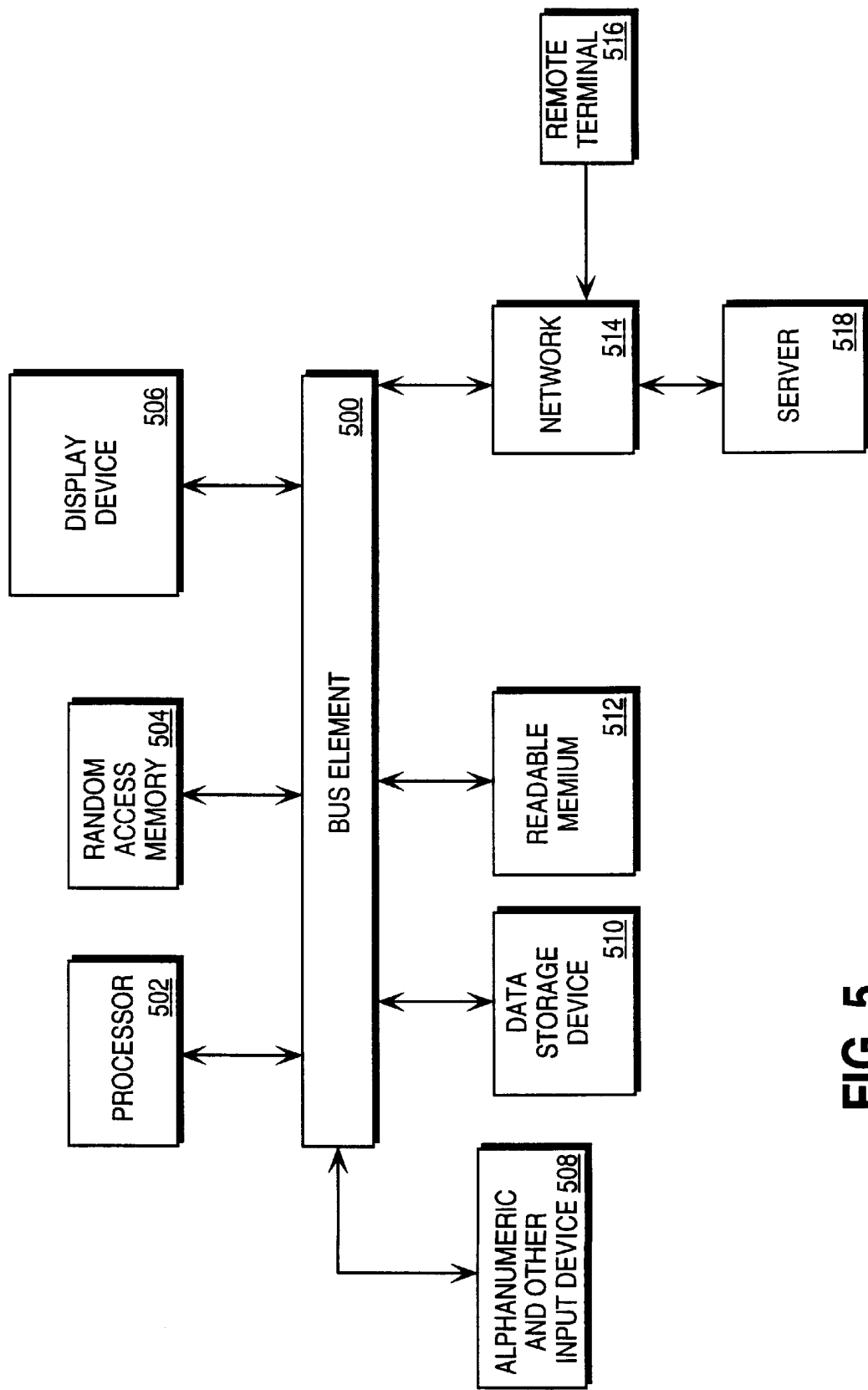
FIG. 5 illustrates a general purpose computer system architecture.

Since an operating system's program loader may modify software modules when the loader moves the modules from secondary memory such as data storage device 510 shown in FIG. 5 to primary memory such random access memory 504 shown in FIG. 5, the memory checker may include intelligence to reverse such modifications. In particular, a program loader often modifies program instructions to reflect the address changes from the secondary memory to the primary memory. The memory checker in one embodiment of the invention may elect to copy the affected regions of the modules from the primary memory, reverse the address modifications and then attempt to reconstruct and validate the signed image of the module.

Thus, a method and apparatus for authenticating the integrity of software modules has been disclosed. Although the present invention has been described particularly with reference to the figures, it will be apparent to one of the ordinary skill in the art that the present invention may appear in any number of systems which provide data integrity verification and authentication functionality. It is further contemplated that many changes and modifications may be made by one of ordinary skill in the art without departing from the spirit and scope of the present invention.

What is claimed is:

1. A method of authenticating and verifying the integrity of software modules, the method comprising:
    a. establishing and registering a first credential for a local software module and a second credential for a partner software module, wherein said first and second credentials reside externally to said local and partner software modules;
    b. authenticating the integrity of said local and partner software modules by deriving and validating information from said first and second credentials; and
    c. securing linkage between said local software module and said partner software module.

2. The method according to claim 1, wherein said local and said partner software modules reside on a machine readable medium.

3. The method according to claim 1, wherein (a) further comprising:
    providing a first digital signature of said local software module in said first credential;
    providing a first digital certificate of said local software module issued by said partner software module in said first credential;
    providing a first reference to said local software module in said first credential;
    providing a second digital signature of said partner software module in said second credential;
    providing a second digital certificate of said partner software module issued by said local software module in said second credential; and
    providing a second reference to said partner software module in said second credential.

4. The method according to claim 1, wherein (b) further comprises:
    identifying and validating said first and second certificates within said first and second credentials; and
    identifying and validating said first and second digital signatures within said first and second credentials.

5. The method according to claim 4, wherein (c) further comprises:
    having a machine execute said local and partner software modules in said machine's memory locations; and
    validating said memory locations and contents of said memory locations.

6. An apparatus for authenticating and verifying the integrity of software modules, the apparatus comprising:
    a. means for establishing and registering a first credential for a local software module and a second credential for a partner software module, wherein said first and second credentials reside externally to said local and partner software modules;
    b. means for authenticating the integrity of said local and partner software modules by deriving and validating information from said first and second credentials; and
    c. means for securing linkage between said local software module and said partner software module.

7. The apparatus according to claim 6, wherein said local and said partner software modules reside on a machine readable medium.

8. The apparatus according to claim 6, wherein (a) further comprises:
    providing a first digital signature of said local software module in said first credential;
    providing a first digital certificate of said local software module issued by said partner software module in said first credential;
    providing a first reference to said local software module in said first credential;
    providing a second digital signature of said partner software module in said second credential;
    providing a second digital certificate of said partner software module issued by said local software module in said second credential; and
    providing a second reference to said partner software module in said second credential.

9. The apparatus according to claim 6, wherein b further comprises:
    means for identifying and validating said first and second certificates within said first and second credentials; and
    means for identifying and validating said first and second digital signatures within said first and second credentials.

10. The apparatus according to claim 9, wherein said securing means further comprises:
    executing said local and partner software modules in said apparatus's memory locations; and
    validating said memory locations and contents of said memory locations.

11. An apparatus for authenticating and verifying the integrity of software modules, the apparatus comprising:

a. a credential builder to establish and to register a first credential for a local software module and a second credential for a partner software module, wherein said first and second credentials reside externally to said local and partner software modules;

b. a credential verifier to authenticat the integrity of said local and partner software module by deriving and validating information from said first and second credentials; and c. a memory checker to secure linkage between said local software module and said partner software module.

12. The apparatus according to claim 11, wherein said local software and said partner software modules reside on a machine readable medium.

13. The apparatus according to claim 11, wherein said credential builder further comprises:

providing a first digital signature of said local software module in said first credential;

providing a first digital certificate of said local software module issued by said partner software module in said first credential;

providing a first reference to said local software module in said first credential;

providing a second digital signature of said partner software module in said second credential;

providing a second digital certificate of said partner software module issued by said local software module in said second credential; and providing a second reference to said partner software module in said second credential.

14. The apparatus according to claim 11, wherein said credential verifier further comprises:

registry entries to reference to said first and second credentials;

a certificate verifier to validate said first and second certificates within said first and second credentials; and a digital signature verifier validate said first and second digital signatures within said first and second credentials.

15. The apparatus according to claim 14, wherein said memory checker further comprises:

executing said local and partner software modules in said apparatus's memory locations; and validating said memory locations and contents of said memory locations.

16. A machine readable medium having embodied thereon instructions, which when executed by a machine, causes said machine to:

authenticate the integrity of software modules on said medium by a. establishing and registering a first credential for a local software module and a second credential for a partner software module, wherein said first and second credentials reside externally to said local and partner software modules;

b. authenticating the integrity of said local and partner software modules by deriving and validating information from said first and second credentials; and c. securing linkage between said local software module and said partner software module.

17. The machine readable medium according to claim 16, wherein (a) further comprises:

providing a first digital signature of said local software module in said first credential;

providing a first digital certificate of said local software module issued by said partner software module in said first credential;

providing a first reference to said local software module in said first credential;

providing a second digital signature of said partner software module in said second credential;

providing a second digital certificate of said partner software module issued by said local software module in said second credential; and providing a second reference to said partner software module in said second credential.

18. The machine readable medium according to claim 16, wherein (b) further comprises:

identifying and validating said first and second certificates within said first and second credentials; and identifying and validating said first and second digital signatures within said first and second credentials.

19. The machine readable medium according to claim 18, wherein (c) further comprises:

executing said local and partner software modules in said machine's memory locations; and validating said memory locations and contents of said memory locations.

* * * * *